Figure 2:
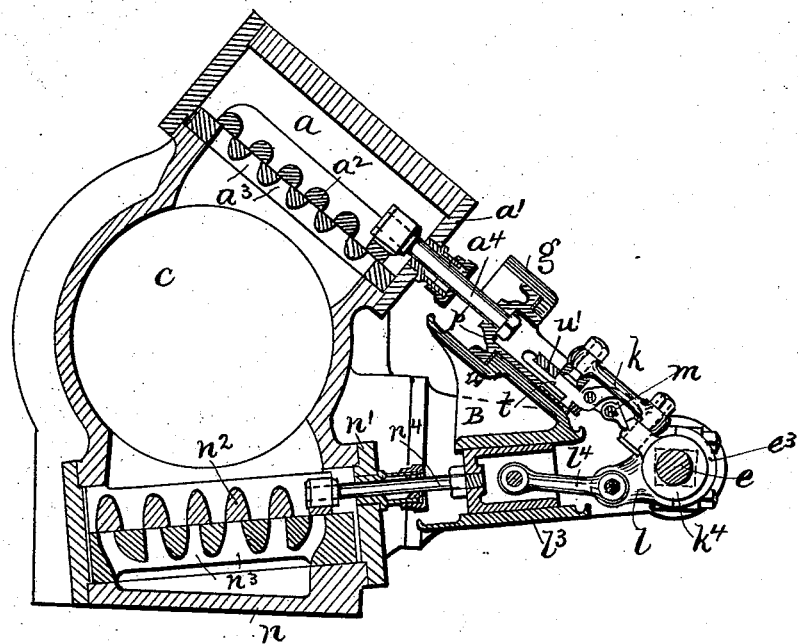

(No Model.)　　　　　　　　　　　4 Sheets—Sheet 1.
W. F. BROWN.
VALVE GEAR FOR STEAM ENGINES.
No. 524,306.　　　　　　　　　　Patented Aug. 14, 1894.
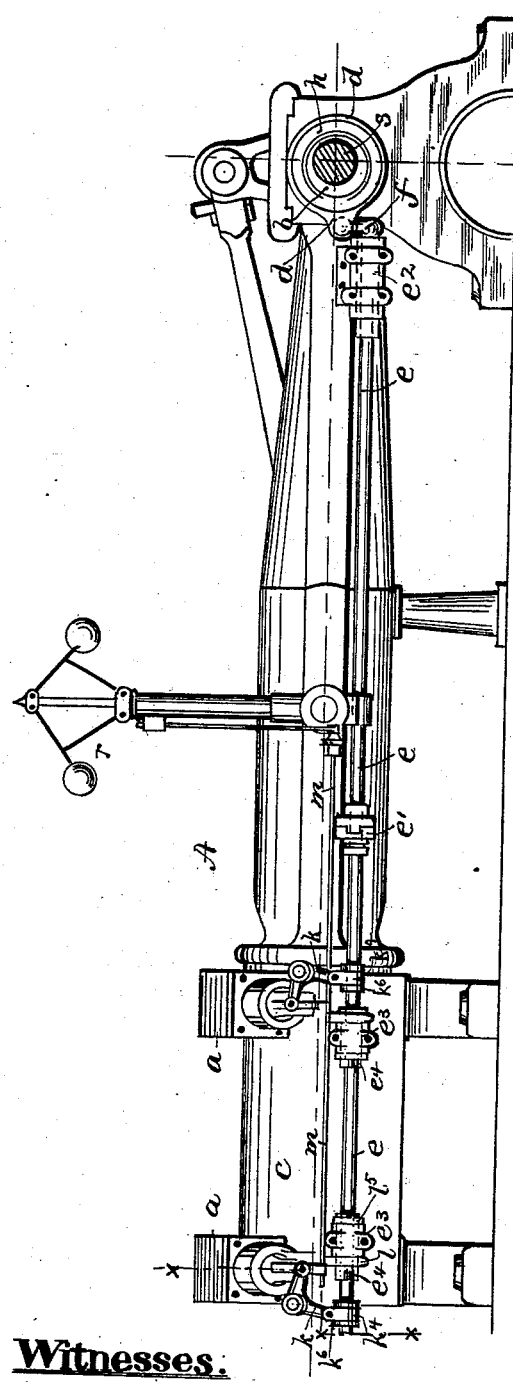
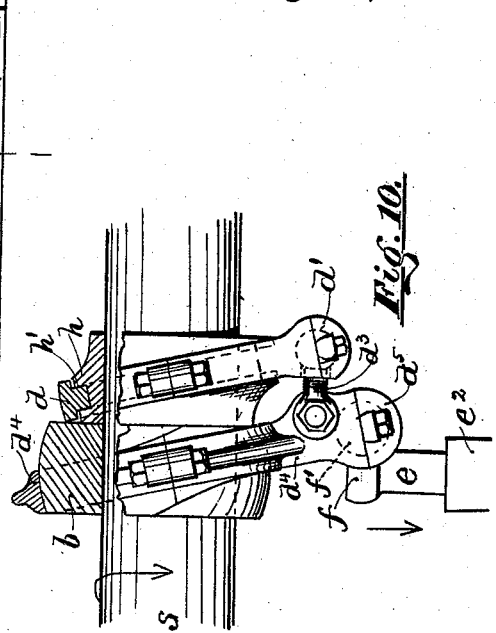
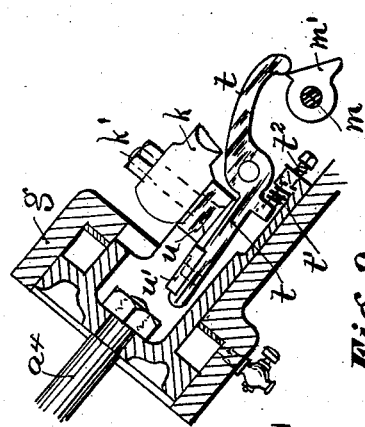
Witnesses.
Fred Arnold
Ida M. Warren
Inventor.
Walter F. Brown.
by Remington Hinthorn
Attys.

(No Model.)

W. F. BROWN.
VALVE GEAR FOR STEAM ENGINES.

No. 524,306. Patented Aug. 14, 1894.

4 Sheets—Sheet 2.

Witnesses.
Fred Arnold
Ida M. Warren

Inventor.
Walter F. Brown.
by Remington & Henton
Attys.

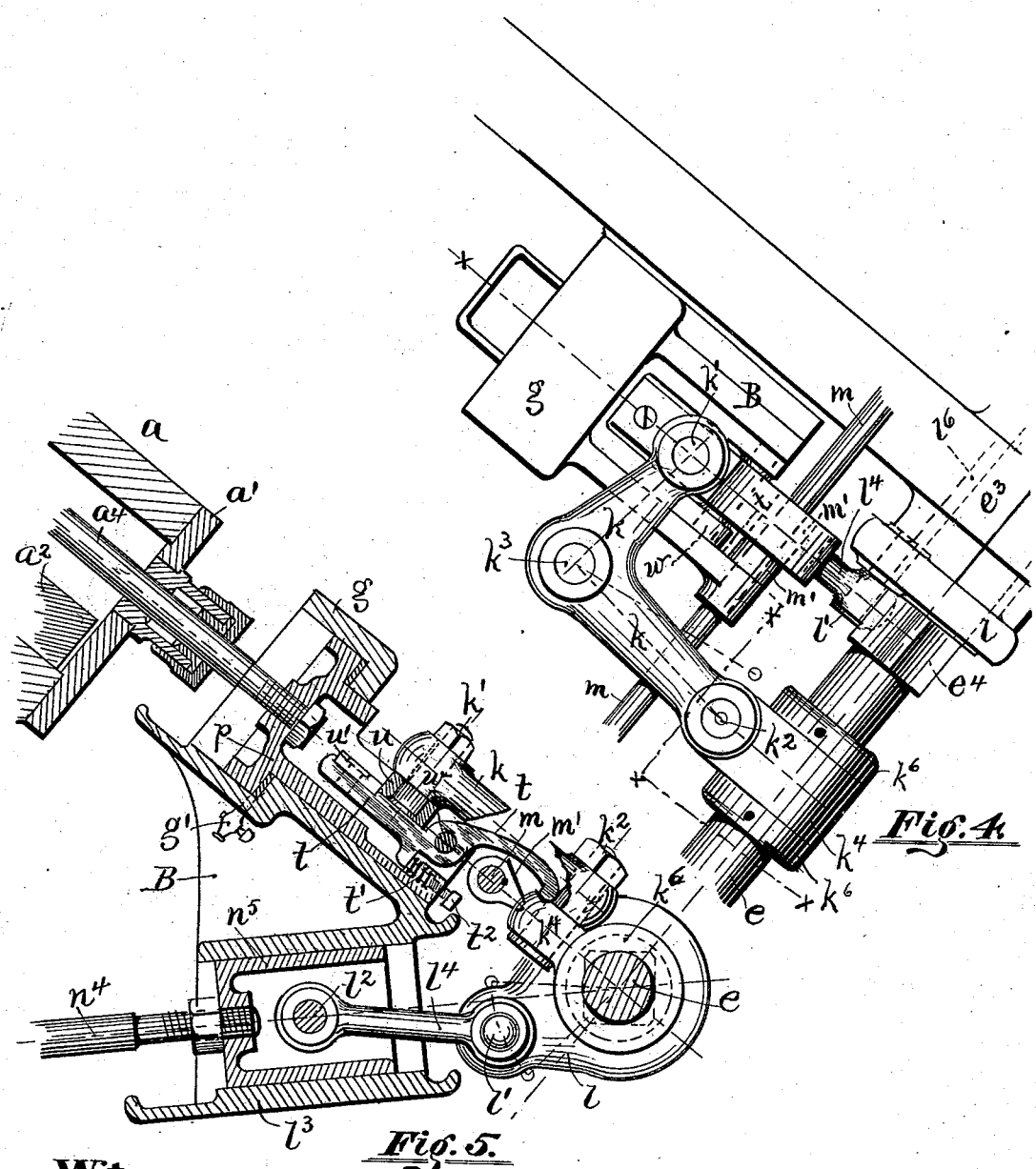

(No Model.) 4 Sheets—Sheet 4.

W. F. BROWN.
VALVE GEAR FOR STEAM ENGINES.

No. 524,306. Patented Aug. 14, 1894.

Witnesses.
Fred Arnold
Ida M. Warren.

Inventor.
Walter F. Brown.
by Remington & Henthorn
Att'ys.

UNITED STATES PATENT OFFICE.

WALTER F. BROWN, OF PROVIDENCE, RHODE ISLAND.

VALVE-GEAR FOR STEAM-ENGINES.

SPECIFICATION forming part of Letters Patent No. 524,306, dated August 14, 1894.

Application filed April 7, 1894. Serial No. 506,721. (No model.)

*To all whom it may concern:*

Be it known that I, WALTER F. BROWN, a citizen of the United States, residing at Providence, in the county of Providence and State of Rhode Island, have invented certain new and useful Improvements in Valve-Gear for Steam-Engines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in valve gear, or mechanism for operating the valves of a steam engine.

The said invention is more especially adapted for engines provided with independent steam and exhaust valves, such for example as have steam and exhaust valves at each end of the cylinder, or in other words a four-valve automatic cut-off engine, say of the well known "Corliss" type, provided with detachable valve-gear controlled by the action of the governor, and having the entire valve mechanism actuated by a single eccentric.

My invention consists essentially in the combination with the steam cylinder and independent steam and exhaust valves mounted therein, of an eccentric driven from the engine shaft, a concentric sleeve mounted on the eccentric and adjustably secured thereto, provided with a peripheral groove arranged at an angle or obliquely to the axis of rotation, a movable strap or frame mounted in said groove and a longitudinally extending shaft jointed to the strap and to said valves, constructed and arranged whereby the rotation of the eccentric operates to simultaneously rock the shaft and reciprocate it endwise, to actuate the exhaust and steam valves, respectively, as will be more fully hereinafter set forth.

While single-valve engines have hitherto been provided with eccentrics set obliquely to the driving shaft, yet such former devices have been so constructed that the sleeve or strap mounted on the eccentric is loose and is connected with a governor-pulley for automatically controlling and changing the relation of the sleeve to the eccentric, a yoke being jointed to the sleeve and fixed to the eccentric rod, thus changing the position of the valve in a corresponding degree. I am also aware that eccentrics have been spherically turned and fitted with straps jointed to the valve operating shaft by a ball-and-socket connection; such construction, however, was to provide a comparatively small lateral movement, the latter being necessary in order to overcome the versed sine incident to the angular movement of the valve-shaft; the latter not having a reciprocating motion.

By means of my improvement the valve-gear of automatic cut-off steam engines of the four-valve type may be greatly simplified; the cost is less and the engine may be run at a higher rate of speed. It is well known that stationary steam engines of the class before referred to, and as usually constructed, cannot be operated safely at comparatively quick speeds, owing to the great degree of movement required to actuate the valve-gear; the result being to produce excessive vibrations in the eccentric-rods and other moving parts connected therewith.

The object I have in view is to provide four-valve engines having governor-controlled liberating valve-gear with means whereby they may be run safely at a greater speed than hitherto, the device at the same time rendering the tripping or releasing mechanism more sensitive to the action of the governor. Another advantage resulting from my invention is that the several parts entering into the valve-gear mechanism are readily accessible for adjustment.

Figure 3:
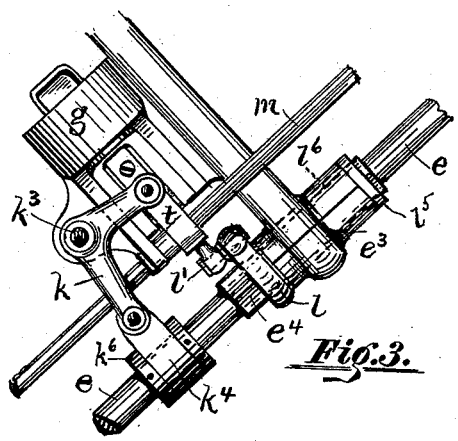
Figure 7:
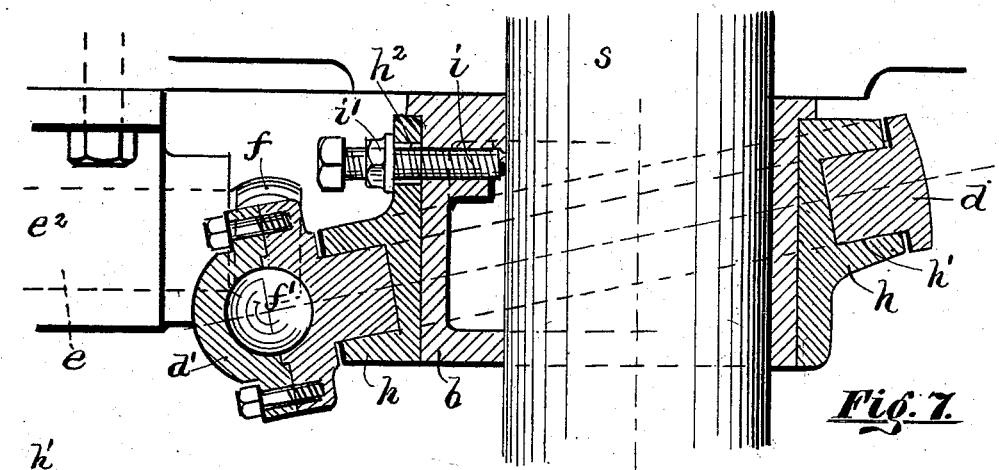
Figure 8:
Figure 6:
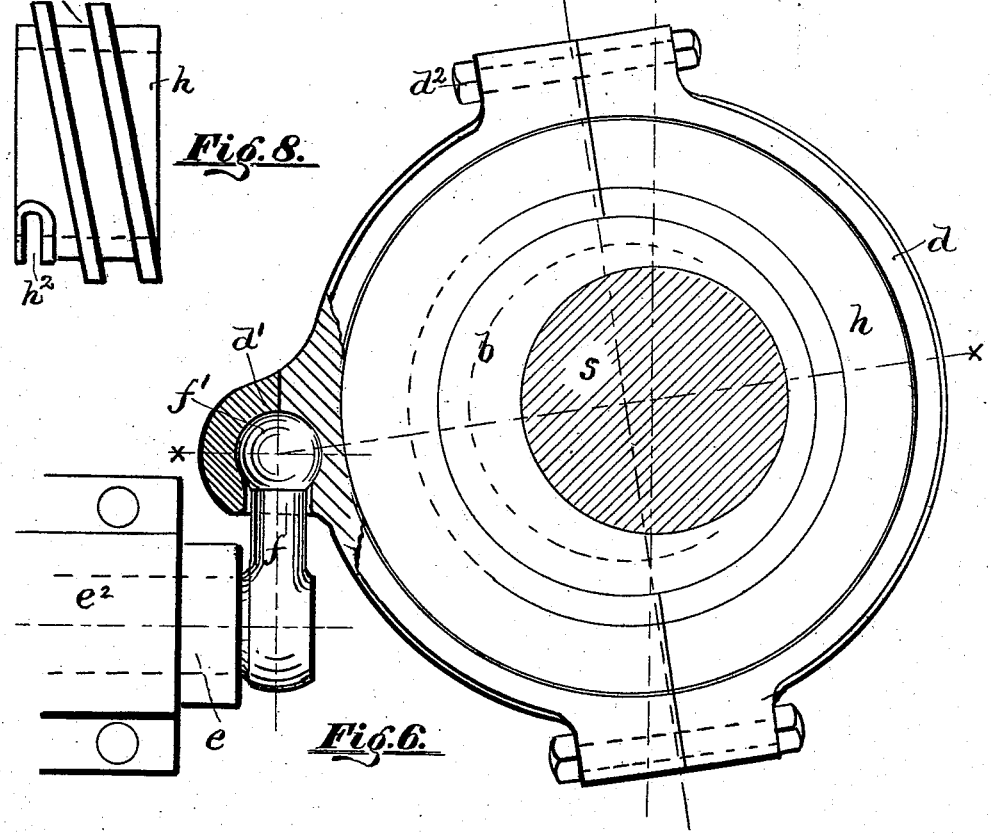

In the accompanying four sheets of drawings, Figure 1 is a rear side elevation of a four-valve engine embodying my improvements. Fig. 2 is a transverse sectional view of the cylinder, &c., in enlarged scale, taken substantially on line $x\,x$ of Fig. 1. Fig. 3 is a corresponding plan view of the valve-operating mechanism. Fig. 4 is a similar plan view, further enlarged. Fig. 5 is a sectional view, taken on the irregular line $x\,x$ of Fig. 4. Fig. 6 is a front elevation of the eccentric &c., a portion being broken away. Fig. 7 is a corresponding horizontal sectional view, taken on line $x\,x$ of Fig. 6. Fig. 8 is a side view of the concentric sleeve provided with a diagonal groove in its periphery. Fig. 9 is a sectional view showing the relation of the several parts of the detached valve-gear at the instant of being tripped or released, and Fig. 10 is a side elevation, in partial section, showing a modification of the device for operating the valve-actuating shaft.

In the drawings A, Fig. 1, designates a four-valve engine provided with my improvements. The steam cylinder $c$ is provided at each end with steam and exhaust chests $a, n$, respectively, see Fig. 2. As drawn the chests are arranged at an angle to each other. The steam valve $a^2$ and exhaust-valve $n^2$ are provided with multiple steam openings arranged with relation to the corresponding ports $a^3$ and $n^3$, substantially like the well-known "gridiron" valve. The steam valve-stem $a^4$ passes through the packing of the front head or bonnet $a'$ and is secured to the small piston or plunger $p$ of the dash-pot or vacuum-chamber $g$. The said piston extends through the vessel and is mounted to slide in ways formed in the frame or casting B, see Fig. 5, &c. A short pin $w$, is fixed to said extension on which a two-arm hook-lever $t$ is fulcrumed; the upper portion of the lever is provided with a steel hook-block $u'$ arranged to contact with a similar block $u$ secured to the bolt $k'$ of the valve-operating lever $k$, soon to be described. The opposite end of the lever $t$ is bent and adapted to engage the inclined face of the tripping-plate $m'$ secured to the small horizontal shaft $m$ connected with the usual fly-ball governor $r$ (Fig. 1) as common. The action of the governor is to vibrate or oscillate the shaft corresponding with the varying load carried by the engine, thus automatically changing the relation of the parts $m'$ and $t$ and determining the point of cut-off by detaching or unhooking the block $u'$ from the block $u$, when sufficient steam has been introduced into the cylinder through the valve $a^2$; said valve instantly and automatically closing by reason of the vacuum-pot plunger, as common to steam engines having detachable valve-gear.

The exhaust valve $n^2$ is attached to a stem or rod $n^4$ passing through the front bonnet $n'$ and is secured to a slide or cross-head $n^5$ arranged to reciprocate in a guide $l^3$ forming a part of said casting B, see Fig. 5. The cross-head is provided with a joint-pin $l^2$ on which an end of the connection $l^4$ is journaled; the opposite end of said connection being mounted on a pin $l'$ fixed to a short arm or crank $l$, from which latter motion is transmitted to the valve.

$e$ indicates a horizontally mounted shaft, extending practically the length of the engine. This shaft has a combined vibratory and reciprocating rectilinear movement and is employed to actuate the four main valves of the engine. It is connected for operating the steam-valves as follows: By referring to Fig. 4 it will be seen that the shaft $e$ passes through a short crank $k^4$, the latter having a pin or bolt $k^2$ secured thereto to which is jointed one arm of the bell-crank lever $k$; the free end of the other arm having the hook-block $u$, before described, secured to its under side by means of the bolt $k'$; the crank $k^4$ being loosely mounted on the shaft. Now in order to vibrate the steam-lever $k$, fulcrumed on a suitably mounted pin $k^3$, a pair of thrust collars $k^6$ are secured to the shaft, between the adjacent faces of which collars the crank is freely held; thus it will be apparent that upon reciprocating the shaft $e$ endwise the lever $k$ will be correspondingly vibrated to open the steam-valve, while at the same time the shaft itself is free to oscillate.

The exhaust-valve operating mechanism is as follows: For this purpose I utilize only the oscillatory movement of the shaft $e$ while at the same time the reciprocatory movement is employed for actuating the steam-valves. To the rear side of the cylinder are located two fixed bearings $e^3$, each being contiguous to the corresponding exhaust chest. In this bearing is mounted a bushing $l^6$ terminating in end thrust collars $l, l^5$; the bushing or sleeve is provided longitudinally with a central square hole in which the shaft freely works in an endwise direction; the shaft itself being square at said portions, see $e^4$. The collar $l$ of the bushing is extended transversely of the shaft, thus forming a short arm or lever; in this lever is fixed a joint-pin $l'$ on which is mounted an eye of the link or connection $l^4$, the opposite end of the latter being jointed to the said pin $l^2$ of the cross-head $n^5$. From this it will be seen that while the shaft may be freely moving back and forth through the bushing, it at the same time will by reason of the vibratory motion imparted to it vibrate the bushing correspondingly and thus move the exhaust valve $n^2$ to and fro, as in opening and closing.

I will now describe mechanism for simultaneously imparting both vibratory and reciprocating rectilinear motions to the valve-operating shaft $e$. As drawn such compound movement is derived from the main or crank-shaft $s$ on which is mounted an eccentric $b$, Figs. 6 and 7. The periphery of the eccentric is turned to receive a concentric sleeve $h$, the latter in turn being provided with a concentric circumferential groove $h'$ arranged obliquely or diagonally, see also Fig. 8. The said parts $b$ and $h$ are adjustably secured together and to the shaft $s$ by means of a set-screw or bolt $i$ and check-nut $i'$. The sleeve is further provided with a slotted opening $h^2$ through which the bolt freely passes. By means of this opening the position or relation of the sleeve to the eccentric can be quickly and easily effected, the nut $i'$ serving to hold it in position after such adjustment. In the said groove $h'$ a two-part strap or frame $d$ is loosely mounted; the same being in some respects analogous to an eccentric-strap, so called. In the present case, however, instead of being directly secured to an eccentric-rod the strap-end is provided with a cap $d'$ and is turned out to receive the spherical or free end $f'$ of an arm or crank $f$ secured to or integral with the said shaft $e$; see Fig. 6, &c.; the shaft at this point being mounted in a fixed bearing $e^2$. Thus it will be evident that while the revolving eccentric proper ($b$) operates to reciprocate the shaft $e$ to and fro through the medium of the strap $d$ and crank $f$, the diagonal groove $h'$ of the sleeve $h$, revolving in unison with the eccentric, at the same time causes the strap to vibrate from side to side (as limited by the angularity of the groove) thereby swinging the crank $f$ and producing a corresponding rocking or vibratory movement to the shaft, such combined movements being transmitted to and utilized for actuating the several valves.

In Fig. 10 I have represented a modified form of mechanism arranged to produce the compound movement hereinbefore described. In this case both the eccentric $b$ and concentric sleeve $h$ are adjustably secured directly to the main shaft $s$. The surface of the eccentric is turned spherically and is provided with an eccentric strap $d^4$ fitted to move thereon, in a manner similar to the well-known ball-and-socket-joint. In the angular groove $h'$ of the sleeve or collar $h$ is mounted the hereinbefore described strap or frame $d$; in the present arrangement, however, the strap-end $d'$ is adapted to receive the spherical end of a short-link or connection $d^3$ also jointed to the said strap $d^4$; the end of the latter is turned out to receive the said spherical or free end $f'$ of the crank $f$ integral with the shaft $e$ as shown. This device since it is not claimed herewith I purpose to have form the subject of a subsequent separate application for Letters Patent.

As before stated my present invention is more particularly adapted to be employed in steam engines having four valves, two steam and two exhaust valves; the steam valves being of the detachable or liberating type in which the point of steam cut-off is determined and controlled by the action of the governor. The construction and arrangement of the several parts entering into the device render the complete valve-gear easily accessible for inspection and repair, and the speed of the engine may be increased with less liability of injury to the moving parts. For convenience in making the adjustment of the valves, &c., the shaft $e$ may be separable, and provided with a clutch-coupling, as at $e'$, Fig. 1.

I claim as new and desire to secure by United States Letters Patent—

1. In an automatic cut-off steam engine, the combination, with independently adjustable steam and exhaust valves and governor mechanism for controlling the point of cut-off, of an eccentric adapted to be adjustably secured to the main shaft, a concentric sleeve mounted on and adjustably fixed to the eccentric provided with a peripheral groove arranged at an angle or obliquely to the axis of rotation, a strap or frame mounted in said groove and a longitudinally extending shaft jointed to the valve connections, and universally jointed to said strap or frame constructed and arranged whereby the rotation of the eccentric imparts combined oscillatory and reciprocating movements to the said shaft to actuate the exhaust and steam valves respectively, substantially as described.

2. The valve operating device, substantially as hereinbefore described, comprising a suitably mounted longitudinal shaft or rod $e$ jointed to the valve connections, a main or driving shaft $s$, an eccentric $b$ secured to said main shaft, a concentric sleeve $h$ adjustably secured to the eccentric having an obliquely arranged groove $h'$ formed in its periphery, and a strap or frame $d$ mounted in the groove and universally jointed to said longitudinal shaft for imparting to the latter a combined oscillatory and reciprocating movement, for the purpose specified.

3. In an automatic cut-off steam engine, a steam cylinder, independently adjustable steam and exhaust valves mounted in the cylinder and means for automatically tripping or releasing the steam valves, in combination with a shaft jointed to the valve connections for actuating the valves, and mechanism for simultaneously imparting to said shaft both vibratory and reciprocating rectilinear motions, substantially as described.

4. In an automatic cut-off steam engine, a steam cylinder, a piston and the usual cooperating parts, steam and exhaust valves arranged at an angle to each other mounted in each end of the cylinder, said steam valves being self-closing and adapted to be tripped or released at different points in the piston's stroke, and governor-controlled means for tripping the steam valves, the combination therewith of a suitably mounted shaft, as $b$, jointed to the connections of the said steam and exhaust valves and means for imparting both vibratory and reciprocating rectilinear motions to the shaft, substantially as hereinbefore described.

In testimony whereof I have affixed my signature in presence of two witnesses.

WALTER F. BROWN.

Witnesses:
GEO. H. REMINGTON,
IDA M. WARREN.